June 9, 1964            M. J. BUZAWA            3,136,840

SYMMETRICAL GAUSS TYPE OBJECTIVE

Filed March 26, 1962

| E.F. = 112.32 | | | f/6.3 | | F.A. = 56° | |
|---|---|---|---|---|---|---|
| LENS | RADII | THICKNESS | SPACINGS | FOCAL LENGTH | $n_D$ | $\nu$ |
| A | $R_1$ = 35.645 | $t_1$ = 6.75 | $S_1$ = 2.20 | $F_1$ = 91.24 | 1.620 | 60.3 |
|   | $R_2$ = 89.536 |   |   |   |   |   |
| B | $R_3$ = 31.333 | $t_2$ = 4.56 | $S_2$ = 12.28 | $F_2$ = 90.83 | 1.620 | 60.3 |
|   | $R_4$ = 66.681 |   |   |   |   |   |
| C | $R_5$ = 20.80 | $t_3$ = 2.75 |   | $F_3$ = -51.89 | 1.596 | 39.7 |
|   |   |   | DIAPHRAGM |   |   |   |
| D | $R_6$ = -20.80 | $t_4$ = 2.75 |   | $F_4$ = -51.89 | 1.596 | 39.7 |
|   | $R_7$ = -66.681 |   | $S_3$ = 12.28 |   |   |   |
| E | $R_8$ = -31.333 | $t_5$ = 4.56 |   | $F_5$ = 90.83 | 1.620 | 60.3 |
| F | $R_9$ = -89.536 | $t_6$ = 6.75 | $S_4$ = 2.20 | $F_6$ = 91.24 | 1.620 | 60.3 |
|   | $R_{10}$ = -35.645 |   |   |   |   |   |

*INVENTOR.*
MICHAEL J. BUZAWA

BY *Frank C. Parker*

ATTORNEY 3,136,840
SYMMETRICAL GAUSS TYPE OBJECTIVE
Michael J. Buzawa, Rochester, N.Y., assignor to Bausch & Lomb Incorporated, Rochester, N.Y., a corporation of New York
Filed Mar. 26, 1962, Ser. No. 182,179
4 Claims. (Cl. 88—57)

This invention relates to an optical objective and more particularly it relates to improvements in a symmetrical Gauss type of lens system which works at or near equal conjugates and is intended primarily for process or optical copying work.

It is an object of this invention to provide a novel Gauss type of objective which is symmetrical in form and works at approximately equal conjugates, said objective being substantially distortion-free and being well corrected for chromatic and monochromatic aberrations as well as astigmatism and field curvature.

Further objects and advantages will be found in the details of construction and arrangement of parts by reference to the specification herebelow taken in connection with the accompanying drawing wherein.

Figures 1, 2:
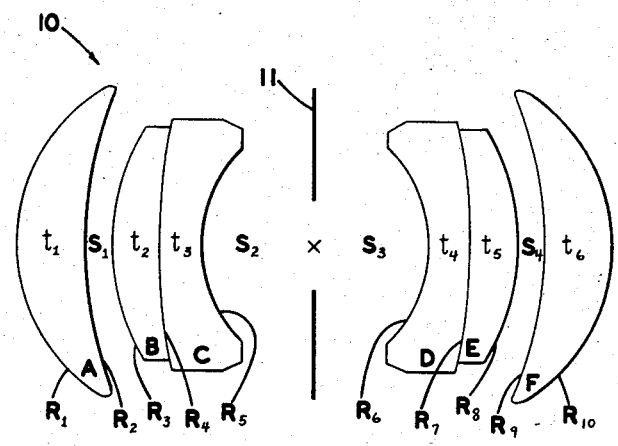
FIG. 1 is an optical diagram of an objective exemplifying my invention.
FIG. 2 is a table of constructional data related to FIG. 1.

The lens system of the above-mentioned objective is designated in the drawing generally by numeral 10, said system being of symmetrical Gauss type of construction which is particularly advantageous in projecting images at or near unity magnification, the front and rear conjugates in the construction herebelow described differing from each other by about 8%.

All of the constructional properties of said objective have been precisely computed and selected to cooperatively produce a distortion-free lens system in which spherical and chromatic aberrations as well as coma, astigmatism and field curvature have been improved and reduced to insignificant amounts.

According to this invention, the lens system comprises a pair of optically aligned meniscus positive lenses A and F having their concave sides facing each other, and between said positive lenses is optically aligned a pair of negative compound meniscus lenses BC and DE which are concave to each other and include a diaphragm 11 centrally therebetween. Each of said compound meniscus lenses comprises a positive meniscus lens which is cemented to a negative meniscus lens. The focal lengths of the positive lenses A or F bear a numerical relation to the adjacent compound lenses BC or DE as stated in the numerical expression herebelow.

$$\frac{F_A}{F_{BC}} \text{ or } \frac{F_F}{F_{DE}} \approx .75$$

wherein $F_A$ and $F_F$ designate the focal lengths of the singlet positive meniscus lenses, and $F_{BC}$ and $F_{DE}$ designate the respective focal lengths of the compound meniscus lenses.

Said optical system is further specified by the ranges of values of its constructional parameters as given in the mathematical expressions herebelow wherein $R_1$ to $R_{10}$ denote the radii of the successive lens surfaces, $t_1$ to $t_6$ denote the axial thicknesses of the successive lenses, $S_1$ to $S_4$ represents the axial spaces between the lenses on either side of the diaphragm 11, $n_D$ represents the refractive index, and $\nu$ represents the Abbe number of the glasses from which the lenses are made, and $F'$ denotes the equivalent focus of the objective, $$.36 < \frac{R_1}{R_2} = \frac{R_{10}}{R_9} < .44$$

$$.43 < \frac{R_3}{R_4} = \frac{R_8}{R_7} < .51$$

$$2.9 < \frac{R_4}{R_5} = \frac{R_7}{R_6} < 3.5$$

$.063F' < t_1 = t_6 < .075F'$
$.036F' < t_2 = t_5 < .044F'$
$.022F' < t_3 = t_4 < .026F'$
$.017F' < S_1 = S_4 < .021F'$
$.09F' < S_2 = S_3 < .12F'$ $1.600 < n_D(A) = n_D(F) < 1.650$
$1.600 < n_D(B) = n_D(E) < 1.650$
$1.500 < n_D(C) = n_D(D) < 1.620$
$55.0 < \nu(A) = \nu(F) < 65.0$
$55.0 < \nu(B) = \nu(E) < 65.0$
$35.0 < \nu(C) = \nu(D) < 45.0$

With respect to the radii $R_1$ to $R_{10}$ per se, these parameters should fall within a range of values as stated in the mathematical expressions herebelow, $.27F' < R_1 = -R_{10} < .35F'$
$.71F' < R_2 = -R_9 < .88F'$
$.23F' < R_3 = -R_8 < .42F'$
$.53F' < R_4 = -R_7 < .66F'$
$.16F' < R_5 = -R_6 < .20F'$ In one successful form of this invention the above mentioned parameters have specific values as given in the table of values herebelow.

$R_1 = -R_{10} = .317F'$           $t_1 = t_6 = .060F'$
$R_2 = -R_9 = .795F'$              $t_2 = t_5 = .0405F'$
$R_3 = -R_8 = .279F'$              $t_3 = t_4 = .0244F'$
$R_4 = -R_7 = .592F'$              $S_1 = S_4 = .0195F'$
$R_5 = -R_6 = .184F'$              $S_2 = S_3 = .109F'$
$n_D(A) = n_D(F) = 1.620$          $\nu(A) = \nu(F) = 60.3$
$n_D(C) = n_D(D) = 1.596$          $\nu(C) = \nu(D) = 39.7$ $S_2$ and $S_3$ being the airspaces located nearest to said diaphragm.

The corresponding numerical values for the aforesaid parameters in the above specified optical system are given in the table herebelow, the various symbols having the same meaning as stated heretofore,

[E.F.=112.32. f/6.3. F.A.=56°]

| Lens | Radii | Thickness | Spacings | Focal length | $n_D$ | $\nu$ |
|---|---|---|---|---|---|---|
| A | $R_1 = 35.645$ | $t_1=6.75$ | $S_1=2.20$ | 91.24 | 1.620 | 60.3 |
|   | $R_2 = 89.536$ | | | | | |
| B | $R_3 = 31.333$ | $t_2=4.56$ | | 90.83 | 1.620 | 60.3 |
|   | $R_4 = 66.681$ | | $S_2=12.28$ Diaphragm | | | |
| C | $R_5 = 20.80$ | $t_3=2.75$ | | −51.89 | 1.596 | 39.7 |
|   | $R_6 = -20.80$ | | | | | |
| D | $R_7 = -66.681$ | $t_4=2.75$ | $S_3=12.28$ | −51.89 | 1.596 | 39.7 |
| E | $R_8 = -31.333$ | $t_5=4.56$ | | 90.83 | 1.620 | 60.3 |
|   | $R_9 = -89.536$ | | | | | |
| F | $R_{10} = -35.645$ | $t_6=6.75$ | $S_4=2.20$ | 91.24 | 1.620 | 60.3 | wherein E.F. denotes the equivalent focus of the objective, f/6.3 denotes the relative aperture, and F.A. denotes the field angle thereof.

Although only a preferred form of my invention has been shown and described in detail, it will be understood that other forms are possible and changes may be made in the specific details thereof without departing from the spirit of the invention as defined in the claims here appended.

I claim:

1. An optical objective of symmetrical form for forming a distortionless image at approximately unity magnification, said objective having a relative aperture of at least f/6.3 and field angle of at least 56° and consisting of a pair of positive exterior meniscus lenses and a pair of compound negative meniscus lenses located therebetween on opposite sides of a central diaphragm, all of said lenses being concave thereto and the negative lenses being formed of a positive outer element cemented to a negative inner element, the constructional parameters of said objective being stated in the table of mathematical expressions given herebelow wherein, $R_1$ to $R_{10}$ represents the radii of the successive lens surfaces, $t_1$ to $t_6$ represents the axial thicknesses of the respective lenses, $S_1$ to $S_4$ represents the successive airspaces on opposite sides of said diaphragm, and wherein $n_D$ and $\nu$ represent the refractive index and Abbe number respectively of the lens materials, the designations (A) (B) (C) (D) (E) (F) signifying the successive lens elements A to F numbering from the front of the objective, and $F'$ designates the equivalent focal length of said objective, $$.36 < \frac{R_1}{R_2} = \frac{R_{10}}{R_9} < .44$$

$$.43 < \frac{R_3}{R_4} = \frac{R_8}{R_7} < .51$$

$$2.9 < \frac{R_4}{R_5} = \frac{R_7}{R_6} < 3.5$$

$.063F' < t_1 = t_6 < .075F'$
$.036F' < t_2 = t_5 < .044F'$
$.022F' < t_3 = t_4 < .026F'$
$.017F' < S_1 = S_4 < .021F'$
$.09F' < S_2 = S_3 < .12F'$
$55.0 < \nu(A) = \nu(F) < 65.0$
$55.0 < \nu(B) = \nu(E) < 65.0$
$35.0 < \nu(C) = \nu(D) < 45.0$
$1.600 < n_D(A) = n_D(F) < 1.650$
$1.600 < n_D(B) = n_D(E) < 1.650$
$1.500 < n_D(C) = n_D(D) < 1.620$

2. An optical objective of symmetrical form for forming a distortionless image at approximately unity magnification, said objective having a relative aperture of at least f/6.3 and field angle of at least 56° and consisting of a pair of positive exterior meniscus lenses and a pair of compound negative mensicus lenses located therebetween on opposite sides of a central diaphragm, all of said lenses being concave thereto and the negative lenses being formed of a positive outer element cemented to a negative inner element, the constructional parameters of said objective being stated in the table of mathematical expressions given herebelow wherein, $R_1$ to $R_{10}$ represents the radii of the successive lens surfaces, $t_1$ to $t_6$ represents the axial thicknesses of the respective lenses, $S_1$ to $S_4$ represents the successive airspaces on opposite sides of said diaphragm, and wherein $n_D$ and $\nu$ represent respectively the refractive index and Abbe number of the lens materials, the designations (A) (B) (C) (D) (E) (F) signifying the successive lens elements A to F numbering from the front of the objective, $.27F' < R_1 = -R_{10} < .35F'$
$.71F' < R_2 = -R_9 < .88F_1$
$.23F' < R_3 = -R_8 < .42F'$
$.53F' < R_4 = -R_7 < .66F'$
$.16F' < R_5 = -R_6 < .20F'$
$.063F' < t_1 = t_6 < .075F'$
$.036F' < t_2 = t_5 < .044F'$
$.022F' < t_3 = t_4 < .026F'$
$0.17F' < S_1 = S_4 < .021F'$
$.09F' < S_2 = S_3 < .12F'$
$1.600 < n_D(A) = n_D(F) < 1.650$
$1.600 < n_D(B) = n_D(E) < 1.650$
$1.500 < n_D(C) = n_D(D) < 1.620$
$55.0 < \nu(A) = \nu(F) < 65.0$
$55.0 < \nu(B) = \nu(E) < 65.0$
$35.0 < \nu(C) = \nu(D) < 45.0$ $S_2$ and $S_3$ denoting the airspaces located nearest to said central diaphragm, and $F'$ representing the equivalent focus of the objective.

3. An optical objective of symmetrical form for forming a distortionless image at approximately unity magnification, said objective having a relative aperture of at least f/6.3 and field angle of at least 56° and consisting of a pair of positive exterior meniscus lenses and a pair of compound negative meniscus lenses located therebetween on opposite sides of a central diaphragm, all of said lenses being concave thereto and the negative lenses being formed of a postive outer element cemented to a negative inner element, the constructional parameters of said objective being stated in the table of mathematical expressions given herebelow wherein, $R_1$ to $R_{10}$ represents the radii of the successive lens surfaces, $t_1$ to $t_6$ represents the axial thickness of the respective lenses $S_1$ to $S_4$ represents the successive airspaces on opposite sides of said diaphragm, and $n_D$ and $\nu$ represent respectively the refractive index and Abbe number of the lens materials, the designations (A) (B) (C) (D) (E) (F) signifying the successive lens elements A to F numbering from the front of the objective, $R_1 = -R_{10} = .317F'$
$R_2 = -R_9 = .795F'$
$R_3 = -R_8 = .279F'$
$R_4 = -R_7 = .592F'$
$R_5 = -R_6 = .184F'$
$t_1 = t_6 = .060F'$
$t_2 = t_5 = .0405F'$
$t_3 = t_4 = .0244F'$
$S_1 = S_4 = .0195F'$
$S_2 = S_3 = .109F'$
$n_D(A) = n_D(F) = 1.620$
$n_D(B) = n_D(E) = 1.620$
$n_D(C) = n_D(D) = 1.596$
$\nu(A) = \nu(F) = 60.3$
$\nu(B) = \nu(E) = 60.3$
$\nu(C) = \nu(D) = 39.7$ $S_2$ and $S_3$ denoting the airspaces located nearest to said central diaphragm, and $F'$ representing the equivalent focus of the objective.

4. An optical objective of symmetrical form for forming a distortionless image at approximately unity magnification, said objective having a relative aperture of at least $f/6.3$ and field angle of at least 56° and consisting of a pair of positive exterior meniscus lenses and a pair of compound negative meniscus lenses located therebetween on opposite sides of a central diaphragm, all of said lenses being concave thereto and the negative lenses being formed of a postive outer element cemented to a negative inner element, the constructional parameters of said objective being stated in the table of mathematical expressions given herebelow wherein, $R_1$ to $R_{10}$ represents the radii of the successive lens surfaces, $t_1$ to $t_6$ represents the axial thickness of the respective lenses $S_1$ to $S_4$ represents the successive airspaces on opposite sides of said diaphragm, and $n_D$ and $\nu$ represent respectively the refractive index and Abbe number of the lens materials,

[E.F.=112.32. $f/6.3$. F.A.=56°]

| Lens | Radii | Thickness | Spacings | Focal length | $n_D$ | $\nu$ |
|---|---|---|---|---|---|---|
| A | $R_1$ =35.645 | $t_1$=6.75 | $S_1$=2.20 | 91.24 | 1.620 | 60.3 |
|   | $R_2$ =89.536 | | | | | |
| B | $R_3$ =31.333 | $t_2$=4.56 | | 90.83 | 1.620 | 60.3 |
|   | $R_4$ =66.681 | | $S_2$=12.28 | | | |
| C | $R_5$ =20.80 | $t_3$=2.75 | Diaphragm | −51.89 | 1.596 | 39.7 |
| D | $R_6$ =−20.80 | $t_4$=2.75 | | −51.89 | 1.596 | 39.7 |
|   | $R_7$ =−66.681 | | $S_3$=12.28 | | | |
| E | $R_8$ =−31.333 | $t_5$=4.56 | | 90.83 | 1.620 | 60.3 |
|   | $R_9$ =−89.536 | | | | | |
| F | $R_{10}$=−35.645 | $t_6$=6.75 | $S_4$=2.20 | 91.24 | 1.620 | 60.3 | wherein E.F. is an abbreviation for the "equivalent focus" of the objective, $f/6.3$ denotes the relative aperture, and F.A. is an abbreviation for "field angle."

References Cited in the file of this patent

FOREIGN PATENTS 157,040    Great Britian _____ Jan. 20, 1921

UNITED STATES PATENT OFFICE

CERTIFICATE OF CORRECTION

Patent No. 3,136,840                                            June 9, 1964

Michael J. Buzawa

It is hereby certified that error appears in the above numbered patent requiring correction and that the said Letters Patent should read as corrected below.

Column 4, line 25, for "0.17F'" read -- .017F' --; line 51, for "thickness" read -- thicknesses --; column 5, line 12, for "postive" read -- positive --; line 18, for "thickness" read -- thicknesses --.

Signed and sealed this 29th day of September 1964.

(SEAL)
Attest:

ERNEST W. SWIDER                                     EDWARD J. BRENNER
Attesting Officer                                             Commissioner of Patents